(12) United States Patent
Lachenmayer

(10) Patent No.: US 11,559,006 B2
(45) Date of Patent: Jan. 24, 2023

(54) DISRUPTING THE BEHAVIOR AND DEVELOPMENT CYCLE OF WOOD-BORING INSECTS WITH VIBRATION

(71) Applicant: John Richard Lachenmayer, Minnetrista, MN (US)

(72) Inventor: John Richard Lachenmayer, Minnetrista, MN (US)

(*) Notice: Subject to any disclaimer, the term of this patent is extended or adjusted under 35 U.S.C. 154(b) by 79 days.

(21) Appl. No.: 16/709,662

(22) Filed: Dec. 10, 2019

(65) Prior Publication Data

US 2021/0169016 A1    Jun. 10, 2021

(51) Int. Cl.
*A01G 7/06* (2006.01)
*G01H 1/00* (2006.01)

(52) U.S. Cl.
CPC ............. *A01G 7/06* (2013.01); *G01H 1/00* (2013.01)

(58) Field of Classification Search
CPC ................... A01G 7/06; G01H 1/00
See application file for complete search history.

(56) References Cited

U.S. PATENT DOCUMENTS

| | | | |
|---|---|---|---|
| 4,941,356 A | 7/1990 | Pallaske | |
| 5,285,688 A * | 2/1994 | Robbins | G01N 29/14 73/587 |
| 6,442,890 B1 * | 9/2002 | Creeger | A01M 19/00 43/132.1 |
| 6,581,324 B1 * | 6/2003 | Creeger | A01M 19/00 43/132.1 |
| 6,883,375 B2 * | 4/2005 | Dunegan | G01N 29/2462 73/587 |
| 9,107,399 B2 | 8/2015 | Takanashi et al. | |
| 2006/0028345 A1 * | 2/2006 | Lee | A01M 1/026 43/132.1 |
| 2007/0137096 A1 * | 6/2007 | Ragon | A01M 1/02 43/132.1 |
| 2008/0192578 A1 * | 8/2008 | Lee | A01M 1/24 367/139 |
| 2009/0303053 A1 * | 12/2009 | Evans | A01M 1/023 340/573.2 |
| 2012/0167826 A1 * | 7/2012 | Takanashi | A01M 29/22 119/6.5 |
| 2014/0340996 A1 * | 11/2014 | Hofstetter | A01M 29/16 367/139 |
| 2022/0128514 A1 * | 4/2022 | Salloum | G01H 11/08 |

OTHER PUBLICATIONS

Erko et al., 2015, Micro-and nano-structural details of a spider's filter for substrate vibrations: relevance for low-frequency signal transmission, J. R. Soc. Interface 12: 20141111 (Year: 2015).*

(Continued)

*Primary Examiner* — Alexander Satanovsky
*Assistant Examiner* — Lyudmila Zaykova-Feldman
(74) *Attorney, Agent, or Firm* — Barnes & Thornburg LLP; Scott D. Rothenberger

(57) ABSTRACT

A method of disrupting the normal behavior and natural development cycle of wood-boring insects by applying mechanical vibrations and detecting wood-boring insects by monitoring their vibration patterns.

16 Claims, 1 Drawing Sheet

(56) References Cited

OTHER PUBLICATIONS

Erko et al., 2015, Micro-and nano-structural details of a spider's filte for substrate vibrations; relevance for low-frequency signal transmission, J. R. Soc. Interface 12: 20141111 (Year: 2015).*

Zorovic et al., 2015, Laser vibrometry as a diagnostic tool for detecting wood-boring beetle larvae, J Pest Sci, 88:107-112 (Year: 2015).*

Wataru Koyima, Yukio Ishawa, Takuma Takanashi Pupal vibratory signals of a group-living beetle that deter larvae May 1, 2012 US National Library of Medicine, National Institute of Health, Communicative & Integrative Biology https://www.ncbi.nlm.nih.gov/pmc/articles/PMC3419110/.

* cited by examiner

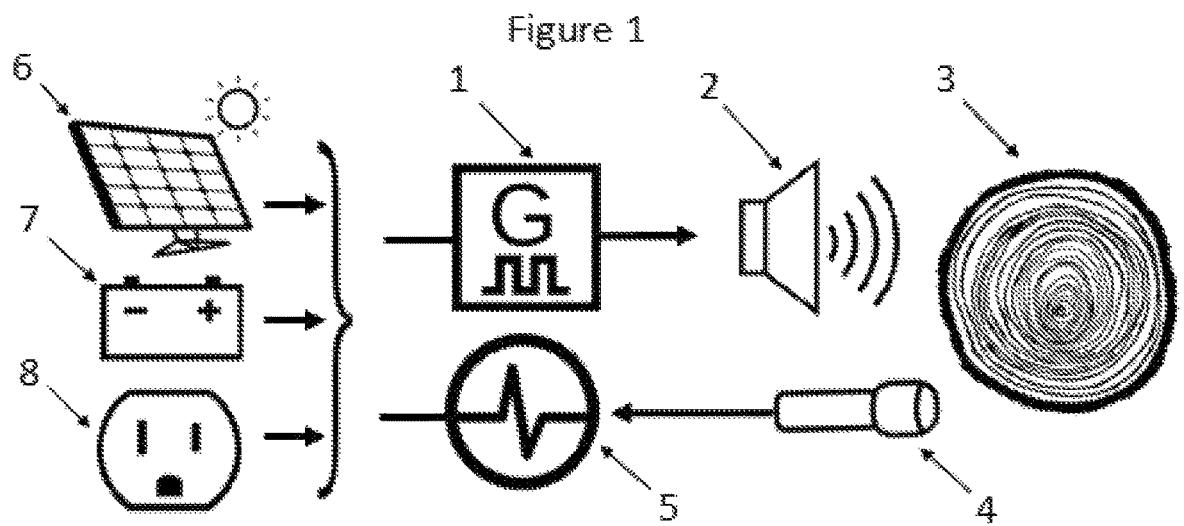
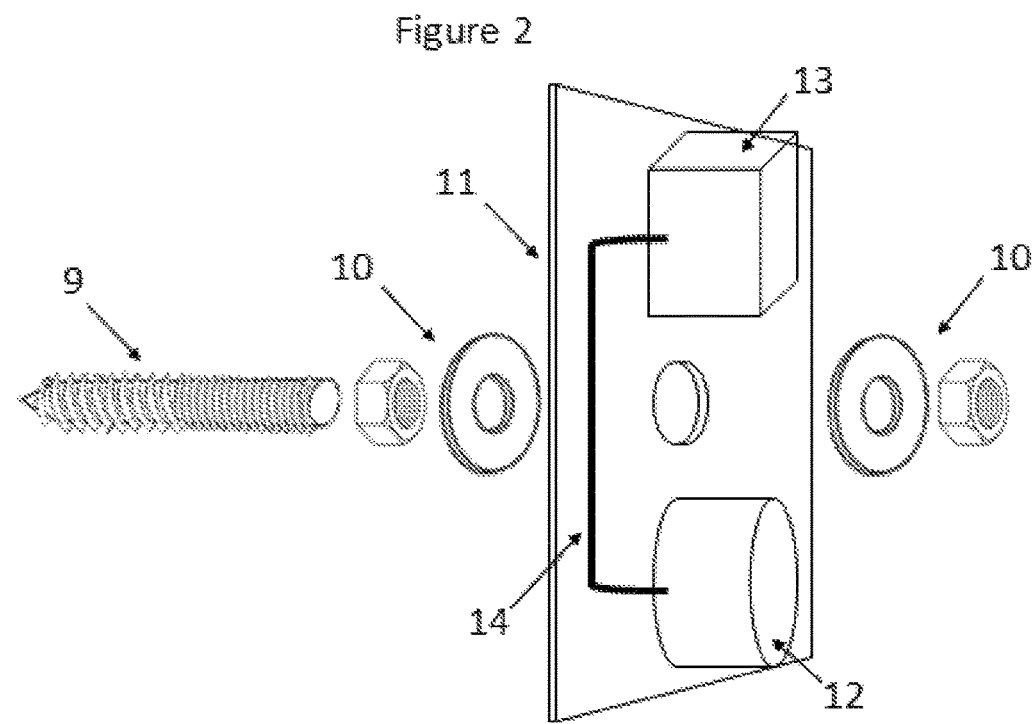

DISRUPTING THE BEHAVIOR AND DEVELOPMENT CYCLE OF WOOD-BORING INSECTS WITH VIBRATION

BACKGROUND OF THE INVENTION

Insects like the Emerald Ash Borer, Asian Longhorn Beetle and Mountain Pine Beetle are destroying our forests. There are no simple ways to stop the spread of these insects. It is known that predators can detect some of their prey by listening for and hearing their prey move below the surface. Examples of this are the robin and the worm, the mole and the grub and the woodpecker and the wood-boring insect. It is also known that prey may stop moving when it knows a predator is nearby. An example of this is the wood-boring insect will stop moving when it detects the vibrations of a nearby woodpecker pecking. It is also known that adult and larvae insects cannot remain immobile for an extended period or their natural development cycle will be disrupted and they may have impaired development or die of starvation. This invention capitalizes on this natural predator/prey interaction to kill insects in trees.

The maximum frequency of a woodpecker pecking on a tree is 20 times per second (20 Hz). The maximum velocity that a woodpecker's head reaches is 7 meters per second. The maximum G-force that each peck from a woodpecker can generate is 1500 Gs within 1 millisecond.

SUMMARY OF THE INVENTION

This invention generates vibration and this vibration is mechanically coupled to a tree in which wood-boring insects are present. These vibrations are detected by the insects and cause them to significantly slow down or stop their movements. Applying the vibrations for a duration of time disrupts the insect's behavior and natural development cycle. An extended disruption results in an impaired insect that may die or minimize its damage to the tree. Great applications of this invention would be to stop the spread of the Emerald Ash Borer, Asian Longhorn Beetle and Mountain Pine Beetle and other invasive insects that destroy trees.

BRIEF DESCRIPTION OF THE DRAWINGS

The preferred embodiment of the invention is depicted in more detail in FIG. 1 and FIG. 2.

FIG. 1 shows the main components of this invention.
1. Signal Generator
2. Vibration Transducer
3. Tree
4. Microphone
5. Signal Analyzer
6. Solar Panel
7. Battery
8. Power Outlet FIG. 2 shows one possible mechanical implementation of this invention.
9. Dual Threaded Screw Post
10. Nuts and Washers
11. Mounting Plate
12. Vibration Transducer
13. Controller including Signal Generator, Signal Analyzer and Microphone
14. Wires and Connector

DETAILED DESCRIPTION OF THE INVENTION

The invention's main structural component is a Dual Threaded Screw Post 9. One end of this post is tapered and can be either threaded like a wood screw or smooth like a nail. This end is mounted through the bark of a tree and into its wood. Located on the other end of this post is a Mounting Plate 11. This plate can be either mated to the post using Nuts and Washers 10 or the plate can be manufactured as part of the post.

The purpose of the Mounting Plate 11 is to mount the Controller 13 and Vibration Transducer 2 & 12. The Controller includes Signal Generator 1, Microphone 4 and Signal Analyzer 5. The Wires and Connector 14, provide electrical connectivity between the Controller 13 and Vibration Transducer 2 & 12.

A Solar Panel 6, Battery 7 and/or Power Outlet 8 provide power to the Signal Generator 1 and Signal Analyzer 5 via Wires and Connector 14. The Signal Generator 1 creates an electrical waveform and sends this waveform to the Vibration Transducer 2 & 12. The electrical shape of the waveform is representative of the vibration to be generated by the Vibration Transducer 2 & 12. This can range in frequency from 0.1 Hz to 20 Hz with preferred frequencies ranging from 1 Hz to 5 Hz.

The Vibration Transducer 2 & 12 converts the electrical waveform into mechanical vibrations that are transferred into the Tree 3 via the Mounting Plate 11 and Dual Threaded Screw Post 9. The mechanical vibrations propagate throughout the Tree 3 in a ringing decay mannerism.

The vibrations are similar to the vibrations generated when a woodpecker is pecking on the Tree 3 while foraging for wood-boring insects. The insects detect this vibration and slow or stop their movement so they will not be detected by the 'would be' predator. The duration of the vibrations disrupts the insect's movement and activity, including its eating habits. This prolonged disruption alters their natural development cycle and results in a deformed insect, which reduces its ability to damage the Tree 3, or it dies of starvation, which stops further damage to the Tree 3.

Different species of insects can have different predators. Therefore, the Signal Generator 1 can produce waveforms with varying amplitude, frequency, shape, duty cycle and duration to more closely match that of the selected predator.

The Microphone 4 and Signal Analyzer 5 are used together to monitor the movement and activity of the insects in the tree. The same Dual Threaded Screw Post 9 that is used to mount the invention to the Tree 3 and transfer the vibrations into the Tree 3 is also used to transfer the movement and activity vibrations generated by the insects in the Tree 3 to a Microphone 4 on the Mounting Bracket 11. This monitoring can provide the system with information to know when the insects have slowed and/or died. The Signal Analyzer 5 can halt the Signal Generator 1 when the elimination is complete. It can provide input to the Signal Generator 1 to modify its waveform. It may also provide a status output, such as LED lights.

The invention claimed is:
1. A method to disrupt an Emerald Ash Borer's or Mountain Pine Beetle's development cycle, comprising the steps:
applying an apparatus to a wood substrate, wherein the apparatus comprises a vibration transducer, a signal analyzer, a power source, a post, a mounting plate, nuts and washers to attach the post to the mounting plate, and a controller comprising a signal generator, a signal analyzer and microphone, wherein the vibration transducer and controller are connected via a connector;
generating mechanical vibrations from the vibration transducer having a mechanical frequency range; and applying the mechanical vibrations from the vibration transducer into the wood substrate, wherein the mechanical frequency range is from 0.1 Hz to 20 Hz, wherein the Emerald Ash Borer's or Mountain Pine Beetle's development cycle is disrupted or results in death.

2. The method according to claim 1, wherein the wood substrate comprises a tree.

3. The method according to claim 1, wherein the wood substrate comprises lumber, plywood, particle board, pallets, crates or barrels.

4. The method according to claim 1, wherein the power source is a battery, a solar panel, an electrical outlet, or a combination of thereof.

5. The method according to claim 1, wherein the Emerald Ash Borer or Mountain Pine Beetle comprises the larva, pupa or adult stage.

6. The method according to claim 1, wherein the microphone and signal analyzer communicate with each other to monitor the movement and activity of the Emerald Ash Borer or Mountain Pine Beetle in the wood substrate.

7. The method according to claim 6, wherein the microphone and signal analyzer communicate with the signal generator when the elimination of the Emerald Ash Borer or Mountain Pine Beetle is complete and the signal generation is stopped.

8. The method according to claim 7, wherein when the signal generation is stopped, the signal analyzer is in communication with an LED which causes illumination of the LED to indicate that the infestation has been eliminated.

9. A method to disrupt an Emerald Ash Borer's or Mountain Pine Beetle's development cycle, comprising the steps:

applying an apparatus to a wood substrate, wherein the apparatus comprises a vibration transducer, a signal analyzer, a power source, a post, a mounting plate, nuts and washers to attach the post to the mounting plate, and a controller comprising a signal generator, a signal analyzer and microphone, wherein the vibration transducer and controller are connected via a connector;

generating mechanical vibrations from the vibration transducer having a mechanical frequency range; and applying the mechanical vibrations from the vibration transducer into the wood substrate, wherein the mechanical frequency range is from 041 Hz to 5 Hz, wherein the Emerald Ash Borer's or the Mountain Pine Beetle's development cycle is disrupted or results in death.

10. The method according to claim 9, wherein the wood substrate comprises a tree.

11. The method according to claim 9, wherein the wood substrate comprises lumber, plywood, particle board, pallets, crates or barrels.

12. The method according to claim 9, wherein the power source is a battery, a solar panel, an electrical outlet, or a combination of thereof.

13. The method according to claim 9, wherein the Emerald Ash Borer or Mountain Pine Beetle comprises the larva, pupa or adult stage.

14. The method according to claim 9, wherein the microphone and signal analyzer communicate with each other to monitor the movement and activity of the Emerald Ash Borer or Mountain Pine Beetle in the wood substrate.

15. The method according to claim 14, wherein the microphone and signal analyzer communicate with the signal generator when the elimination of the Emerald Ash Borer or Mountain Pine Beetle is complete and the signal generation is stopped.

16. The method according to claim 15, wherein when the signal generation is stopped, the signal analyzer is in communication with an LED which causes illumination of the LED to indicate that the infestation has been eliminated.

* * * * *

UNITED STATES PATENT AND TRADEMARK OFFICE
CERTIFICATE OF CORRECTION

| | |
|---|---|
| PATENT NO. | : 11,559,006 B2 |
| APPLICATION NO. | : 16/709662 |
| DATED | : January 24, 2023 |
| INVENTOR(S) | : John Richard Lachenmayer |

It is certified that error appears in the above-identified patent and that said Letters Patent is hereby corrected as shown below:

In the Claims

Column 4, Line 8, after "from", delete "04".

Signed and Sealed this
Thirteenth Day of June, 2023

Katherine Kelly Vidal
*Director of the United States Patent and Trademark Office*